(12) United States Patent
Schroyer

(10) Patent No.: US 11,834,113 B2
(45) Date of Patent: Dec. 5, 2023

(54) TRACK SLIDE ASSEMBLY AND CRAWLER SHOE SYSTEM

(71) Applicant: L&H Industrial, Inc., Gillette, WY (US)

(72) Inventor: William Howard Schroyer, Gillette, WY (US)

(73) Assignee: L&H Industrial, Inc., Gillette, WY (US)

( * ) Notice: Subject to any disclaimer, the term of this patent is extended or adjusted under 35 U.S.C. 154(b) by 511 days.

(21) Appl. No.: 17/191,904

(22) Filed: Mar. 4, 2021

(65) Prior Publication Data

US 2021/0276638 A1 Sep. 9, 2021

Related U.S. Application Data

(60) Provisional application No. 62/986,090, filed on Mar. 6, 2020.

(51) Int. Cl.
*B62D 55/084* (2006.01)
*B62D 55/10* (2006.01)

(52) U.S. Cl.
CPC ..... *B62D 55/0847* (2013.01); *B62D 55/0845* (2013.01); *B62D 55/10* (2013.01)

(58) Field of Classification Search
CPC .................. B62D 55/0847; B62D 55/0845
See application file for complete search history.

(56) References Cited

U.S. PATENT DOCUMENTS

| | | | |
|---|---|---|---|
| 5,941,326 A * | 8/1999 | Fleuchaus | B62D 55/0847 180/9.1 |
| 9,776,676 B2 * | 10/2017 | Scheuerman | B62D 55/15 |
| 9,988,110 B2 | 6/2018 | Scheuerman et al. | |
| 10,328,981 B2 * | 6/2019 | Sibilleau | B62D 55/10 |
| 10,543,876 B2 * | 1/2020 | Dumitru | B62D 55/0845 |
| 2001/0054844 A1 | 12/2001 | Rutz | |
| 2005/0040706 A1 * | 2/2005 | Yamamoto | B62D 55/0882 305/139 |

* cited by examiner

*Primary Examiner* — Jason R Bellinger
(74) *Attorney, Agent, or Firm* — FisherBroyles LLP; Ian R. Walsworth

(57) ABSTRACT

Specially fabricated wear plugs are designed for selective insertion within machined holes in a track slide, which decrease friction material below the surface of the track slide. The wear plugs decrease friction between adjoining parts of the track slide assembly and reduce wear caused through use of the track slide in various applications. Methods of fabricating the wear plugs are also provided.

18 Claims, 4 Drawing Sheets

TRACK SLIDE ASSEMBLY AND CRAWLER SHOE SYSTEM

CROSS REFERENCE TO RELATED APPLICATIONS

This application claims priority to and the benefit of U.S. Provisional Application No. 62/986,090 filed on Mar. 6, 2020, pursuant to 35 U.S.C. § 119(e), which is incorporated by reference herein in its entirety.

FIELD OF THE INVENTION

The field of the invention generally relates to frames and assemblies used in heavy machinery, such as crawler tracks and frames. More specifically, the present disclosure relates to systems, methods and apparatus for reducing wear and improving performance of such assemblies, and which otherwise solves deficiencies in the prior art.

BACKGROUND OF THE INVENTION

Heavy machinery used in excavation/extraction of soil, minerals, etc. are well known in the art, and may comprise a crawler assembly for supporting the weight of components associated with such equipment, not to mention the weight of any load borne by the equipment. In general, a crawler typically comprises a frame, a track, a plurality of links or shoes coupled together and supported for movement relative to the frame along a direction of travel, a sprocket, and a guide rail. The crawler is typically arranged in an articulated track of several links or shoes coupled together to form a continuous loop, whereby the shoes engage the ground on one surface and typically engage a row of rollers along a roller path on the opposite surface (as the track is in motion). These components interact and facilitate movement of the equipment associated with the crawler assembly, and are historically subject to extreme wear over time. More specifically, the weight of the equipment and any loads supported by the equipment are transmitted through the rollers to the shoes, which are often formed of a softer material than the rollers, thereby causing the shoes to wear down and/or deform through repetitive use. In addition, the often hard, rocky surfaces the shoes are exposed to may cause further wear and deformation to the components, requiring periodic repairs and replacement of components that can cost tens to hundreds of thousands of dollars.

Furthermore, the shoes associated with crawler assemblies are often formed of manganese or a manganese alloy, which are relatively softer than the hardness of the components surrounding the shoes and undergo a period of "work hardening" during their initial or break-in period of use. Thus, the shoes may become work-hardened by contact with the rollers, which often occurs during the first 1500 hours of operation. The prior art has not revealed a suitable solution to problems associated with wear and reduction in size of crawler shoes after the break-in period.

Accordingly, the present invention solves these and other problems associated with the prior art, in part by providing a system for reducing wear and friction, avoid attraction of dirt or debris that can cause interference, and allowing for faster, more accurate and safer installation of components of the system described herein. Other advantages and benefits will become apparent after reviewing the Summary and Detailed Description sections below.

SUMMARY OF THE INVENTION

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures.

Accordingly, one object of the present disclosure is to employ components comprising decreased friction material below the surface of the track slide to, in general, decrease friction between adjoining parts of the assembly and reduce wear caused through use of the track slide in various applications.

Another object of the present disclosure is the continued reduction of wear and incumbent benefit to the crawler shoes, particularly after they are broken in and become "work hardened" that typically occurs with manganese-type shoes. As discussed in the preceding section, the prior art only provides a potential solution for reducing wear during the initial break-in period.

Another object of the present disclosure is the use of friction reduction material throughout the full depth of track slide for further enhancing the use and longevity of the assembly and addressing problems associated with continued use and wear caused along the shoe roller path.

Another object of the present disclosure is the reduction of heat generated due to reduced friction throughout the life of the slide (i.e., not only during initial or break-in periods).

Another object of the present disclosure is the reduction of propel force required to pull the shoes associated with crawler and equivalent equipment, including throughout the life of the slides.

Another object of the present disclosure is the use of specially fabricated wear plugs and like components. In embodiments, the wear plugs may be formed of graphite or other friction reduction material and are preferably captured and retained in a machined pocket(s) in the track slides and/or guide rails. In embodiments, the wear plugs are a permanent installation that last the lifetime of the guide rail.

Another object of the present disclosure is to improve upon the efficiency and longevity of system components. According to embodiments, wear plugs of different types may be fabricated and used with the different types of track slide assembly described herein, and may be customized for a certain application or piece of machinery or the surrounding environment of the machinery.

One having skill in the art will appreciate that embodiments of the present disclosure may be constructed of materials known to provide, or predictably manufactured to provide the various aspects of the present disclosure. These materials may include, for example, steel, steel alloy, stainless steel, iron, cast iron, aluminum, aluminum alloy, chromium alloy, graphite, and other metals or metal alloys. These materials may also include, for example, polyurethane, polyethylene, PTFE, UHMW, carbon fiber, resinous materials, and other plastic or synthetic materials.

As utilized herein, the phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being approximations which may be modified in all instances as required for a particular application of the novel apparatus described herein.

The term "a" or "an" entity, as used herein, refers to one or more of that entity. As such, the terms "a" (or "an"), "one or more" and "at least one" can be used interchangeably herein. The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves. For the purpose of supplementing the written description for the present disclosure, the following U.S. patents and pending applications incorporated by reference: U.S. Pat. Nos. 10,865,541; and 10,843,749.

The Summary is neither intended, nor should it be construed, as being representative of the full extent and scope of the present disclosure. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary as well as in the attached drawings and the Detailed Description, and no limitation as to the scope of the present disclosure is intended by either the inclusion or non-inclusion of elements or components when describing certain embodiments herein. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure, and together with the Summary and the Detailed Description serve to explain the principles of these embodiments. In certain instances, details that are not necessary for an understanding of the disclosure or that render other details difficult to perceive may have been omitted. It should be understood, of course, that the present disclosure is not necessarily limited to the particular embodiments illustrated herein. Additionally, it should be understood that the drawings are not necessarily to scale.

In the drawings:

FIG. 1 is an elevation view of a crawler comprising at least one track slide assembly according to an embodiment of the present disclosure;

FIG. 2 is a perspective view of the track slide assembly of FIG. 1;

FIG. 3 is a side elevation view of the track slide assembly of FIG. 1;

FIG. 4A is a top plan view of the track slide assembly of FIG. 1;

FIG. 4B is a sectional view of the track slide assembly of FIG. 4A;

FIG. 4C is an end view of the track slide assembly of FIG. 4A;

FIG. 5 is a perspective view of a track slide assembly according to another embodiment of the present disclosure; and FIG. 6 shows a partially exploded view of the track slide assembly of FIG. 5 depicting at least one wear plug for use with the track slide assembly.

Similar components and/or features may have the same reference number. Components of the same type may be distinguished by a letter following the reference number. If only the reference number is used, the description is applicable to any one of the similar components having the same reference number.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

In this Detailed Description, reference is made to the embodiments depicted in FIGS. 1-6. According to one embodiment, the system may be used with several types of heavy equipment. By way of example but not limitation, the present disclosure may be incorporated with a mining shovel. According to this example, the mining shovel preferably comprises a frame supporting a boom, an elongated handle, and an attachment or dipper coupled to the handle. The handle preferably comprises a first end and a second end, with the second end receivable within a saddle block, thereby permitting rotational and/or translational movement relative to the boom. The frame typically will comprise an upper portion that is supported by an undercarriage having a plurality of crawlers, such as the crawler depicted in FIG. 1.

Still referring to the example of a mining shovel, the boom may comprise a first end coupled to the upper portion of the frame and a second end opposite the first end, a boom sheave, a saddle block, and a shipper shaft. The boom sheave is then coupled to the second end of the boom and guides the rope over the second end. The saddle block is rotatably coupled to the boom by the shipper shaft, which is positioned between the first end and the second end of the boom. The hoist rope is preferably coupled to the dipper by a bail, whereby the dipper may be raised or lowered as the hoist rope is reeled in or paid out, respectively, by the hoist drum.

Figure 1:
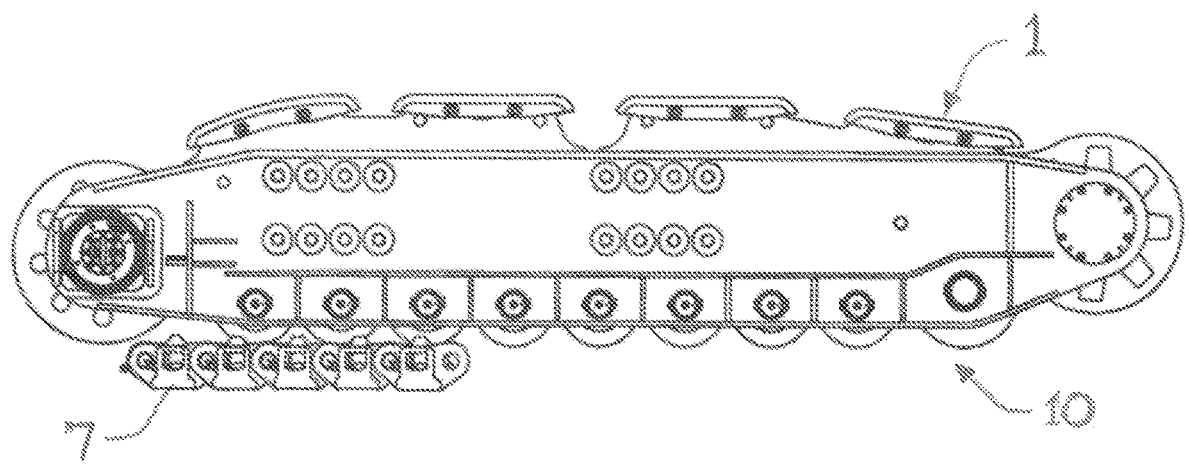

Regardless of the specific type of equipment used in conjunction with the present disclosure, the equipment may comprise one or more crawlers. According to embodiments and with specific reference to FIG. 1, the one or more crawlers 10 each includes a track frame and a track, and may further comprise links or shoes 7 (partially depicted in FIG. 1) coupled together to form an articulated, continuous loop. The track frame comprises a first end and a second end. The first end may support a first sprocket and the second end may support a second sprocket, each permitted to rotate. At least one of the sprockets is driven by a motor. The sprockets in turn engage the crawler shoes 7 (e.g., by teeth extending into spaces between the shoes) thereby driving the shoes 7 around the perimeter of the track frame while the crawlers are in use and the equipment is in motion. As the shoes 7 move along the lower run of the track, the shoes 7 engage with and to a certain degree articulate relative to the ground as the associated equipment moves over the ground. FIG. 1 depicts several other components of the crawler 10 assembly that will be familiar to one of ordinary skill in the mining and heavy machinery arts.

FIG. 1 further depicts an arrangement of track slide assemblies 1 (and shoes 7) for placement along the crawler 10 frame. Other components are described in greater detail both above and below. As one of ordinary skill will appreciate, the shoes 7 and other components of the crawler 10 often become worn during their initial or break-in period and continue to erode beyond this period. This heavy usage and resulting wear on the crawler 10 components causes several problems, including those described above in the Background.

Photographs depict the effects of use of the shoes 7 and track slide assembly 1 relative to the shoe rollers over time. A deviation of approximately 1-1¼ inches is observable in the worn shoes and track slide assembly in comparison to a "template", which serves to identify a new or replacement roller path. A deviation of nearly 2½ inches may be observed along the vertical axis (when measuring the worn shoe roller path in comparison to the template of a new roller path).

Crawler assemblies are further subject to high temperatures during use. For example, the Applicant of the present disclosure observed and recorded environmental temperatures on Nov. 9, 2018 at a location in northern Michigan. On this particular date, the ambient temperature at the site was approximately 20-30° F. By comparison, the recorded temperature of the crawler assembly was 140° F. during operation. Thus, the exposure to wear and the relatively high temperatures during operation can cause further degradation and deformity, especially to softer and/or more malleable materials or parts, including the track slide assemblies 1 and shoes 7.

Figure 2:
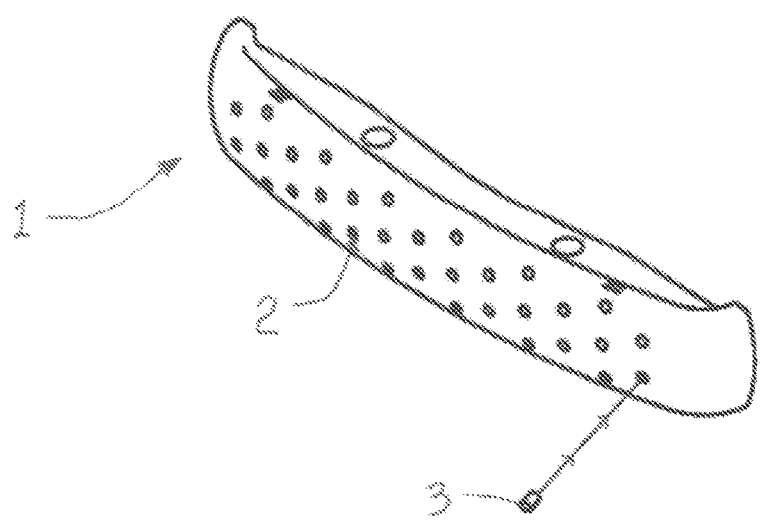

Referring now to FIG. 2, a side perspective view of the track slide assembly 1 of FIG. 1 is depicted. Here, the track slide assembly 1 comprises a first proximal end and a distal second end, with a semi-arcuate surface extending between the two ends as shown in FIG. 2. The semi-arcuate surface may be comprised of different shapes and/or dimensions and is not necessarily arcuate to any particular degree, or to any degree. The semi-arcuate surface preferably comprises a plurality of machined apertures or holes 2 along a top or outer surface of the track slide assembly 1. In embodiments, the semi-arcuate surface or "rail" of the track slide assembly 1 may be altered by machining a plurality of holes 2 in the track slide assembly 1. In other embodiments, the plurality of holes 2 may be fabricated with the original construction of the track slide assembly 1.

In one particular embodiment, there are thirty-two (32) holes 2. In a preferred embodiment, the track slide assembly 1 may comprise a range from twenty-four (24) to forty-eight (48) holes 2 according to one of several arrangements and/or orientations. By way of example but not limitation, certain holes 2 may be oriented in a particular axis relative to the semi-arcuate surface, such as an orientation normal to the semi-arcuate surface as described in connection with FIG. 4B below.

The track slide assembly 1 preferably comprises one or more wear plugs 3. The plurality of holes 2 are preferably machined for a certain dimension to correspond with insertion of wear plugs 3 therein. In embodiments, a single wear plug 3 may be inserted and retained by one or any of the plurality of holes 2 of the track slide assembly 1. In a preferred embodiment are approximately one (1) inch in diameter and approximately three-quarters (¾) inch in depth, although different dimensions are expressly considered within the scope of the present disclosure. In another embodiment, there are thirty-seven (37) holes 2. Different patterns of the plurality of holes 2 may be used other than that depicted in FIG. 2 without departing from the novel aspects of the present disclosure.

Figure 3:
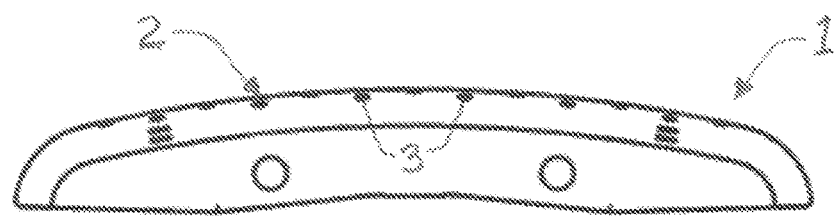

FIG. 3 shows a side elevation view of the track slide assembly 1 of FIG. 2 with wear plugs 3 inserted into each of the plurality of holes 2. The wear plugs 3 may be milled to the precise dimensions of the machined holes 2 for a friction or interference fit therein and may be substantially flush with the semi-arcuate surface of the track slide assembly 1 once inserted. In other embodiments, the wear plugs 3 are inserted in the machined holes 2 as a dry, friction fit between the wear plugs 3 and the semi-arcuate surface of the track slide assembly 1. In a preferred embodiment, the wear plugs 3 are inserted in any one of the plurality of holes 2 with minimal clearance. In embodiments, the interconnection may be facilitated by an adhesive or other bonding agent.

The wear plugs 3 may be comprised of a variety of different materials, but in a preferred embodiment are comprised of a friction reduction material (i.e., a material that reduces friction). In a most preferred embodiment, the wear plugs 3 are comprised of graphite. In alternate embodiments, the wear plugs 3 are comprised of polyurethane, polyethylene, PTFE, UHMW or equivalent synthetic materials.

Figure 4A:
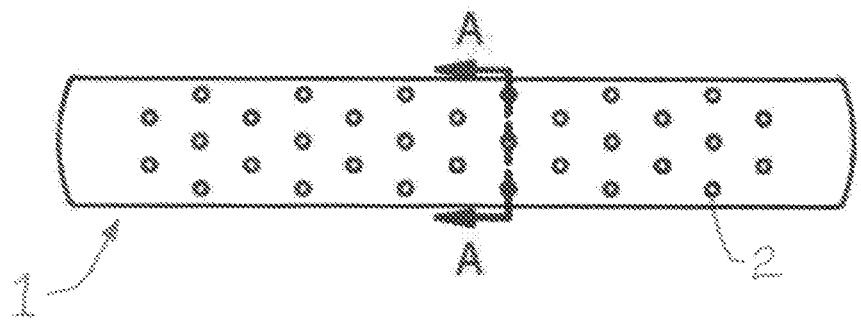
Figure 4B:
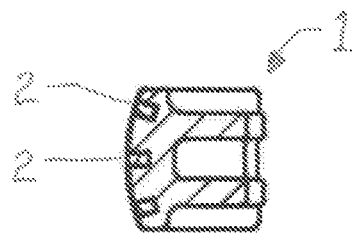
Figure 4C:
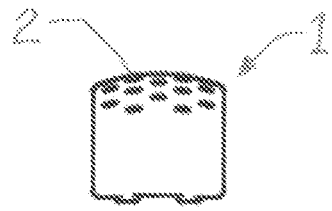

FIGS. 4A-4C depict other aspects of the present disclosure. FIG. 4A shows a top plan view of the track slide assembly 1 to better illustrate the location and arrangement of the plurality of holes 2 in a preferred embodiment. Line A-A depicted in FIG. 4A is the point of reference for the sectional view shown in FIG. 4B, which includes a sectional view through three (3) of the plurality of holes 2. As shown, the orientation of the holes 2 may differ depending on the location of a particular hole 2, and in one embodiment may be orientated with a primary axis that is normal to the semi-arcuate surface of the track slide assembly 1. In other embodiments, the orientation of the holes 2 is congruent throughout the track slide assembly 1. In other embodiments, different orientation of the holes 2 than those shown in FIG. 4B are provided to optimize the benefits of the present disclosure. FIG. 4C shows an end view of the track slide assembly 1 with the pattern and arrangement of the plurality of holes 2 the same as in FIG. 4A.

Figure 5:
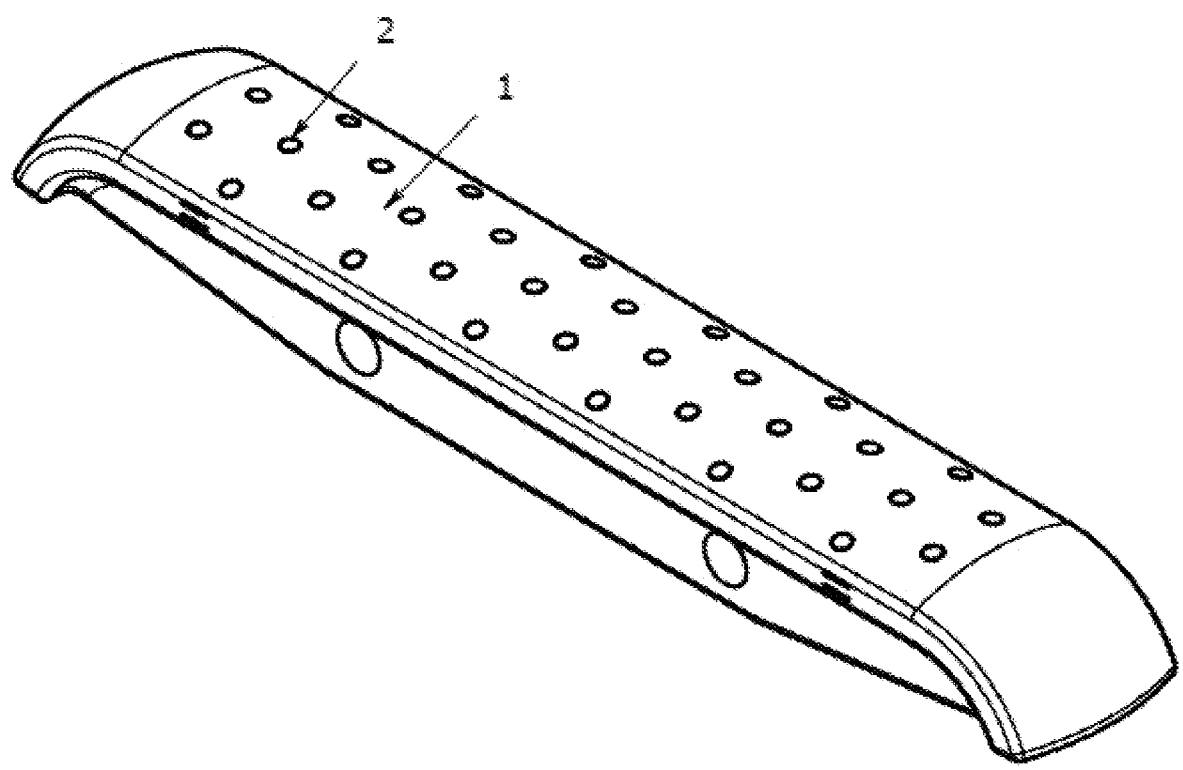
Figure 6:
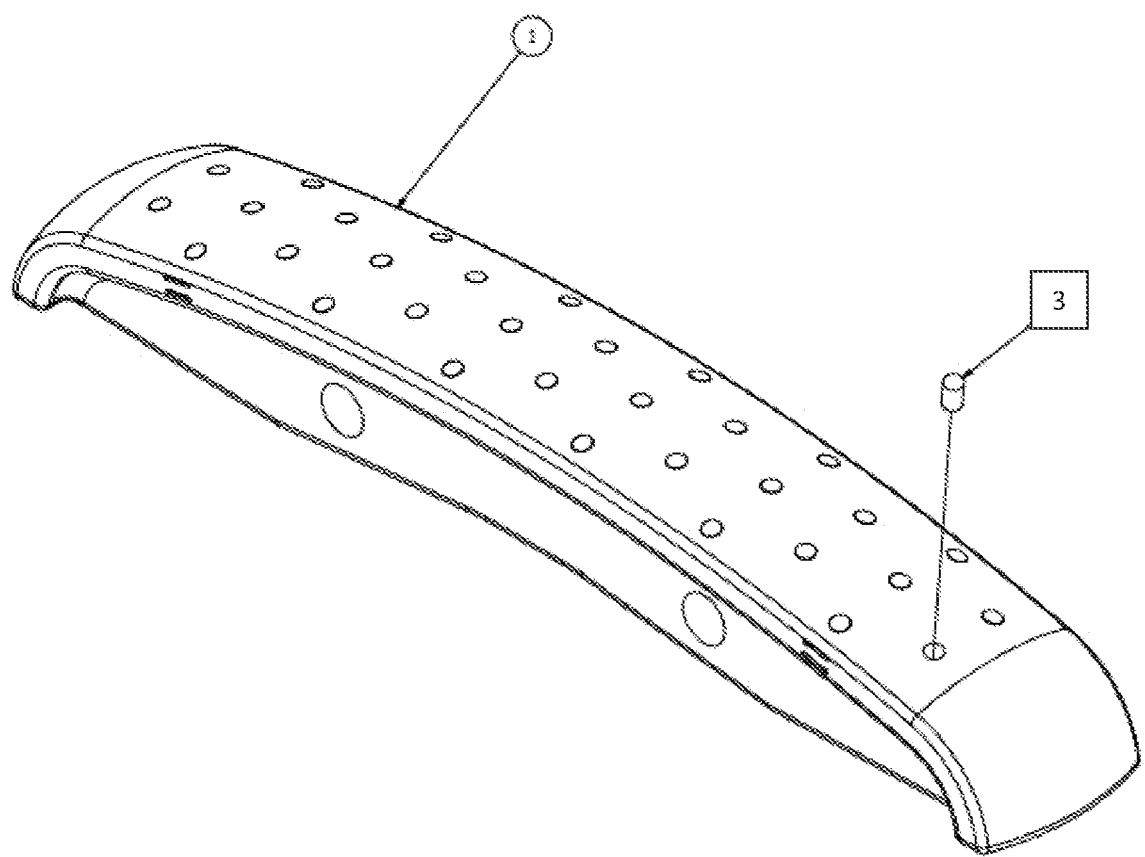

Referring now to FIGS. 5-6, each wear plug 3 is placed in a machined hole 2 on the outer surface of the crawler track slides/rails, which are located along the top of and surround the crawler frame as depicted in FIG. 1. In this manner, the wear plugs 3 may be used on any track-type undercarriage, including but not limited to those types of equipment described above.

The present disclosure of a novel track slide assembly provides an effective and relatively quick manner of upgrading or enhancing a crawler shoe assembly, and further reduces the wear to the crawler shoes throughout the life of the equipment. While prior art systems have been shown to provide temporary coverings or liners in order to reduce wear, those systems only address the wear caused during the break-in period. In contrast, the wear plugs 3 are suitable for continued use, and last well beyond the initial or break-in period. Furthermore, the wear plugs 3 (particularly the graphite plugs) can be used as a dry-friction modifier to the system and will not attract dirt.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims).

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g. the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A track slide assembly, comprising:
   a medial portion comprising a first proximal end and a distal second end;
   the medial portion further comprising a semi-arcuate outer surface extending between the first proximal end and the second distal end, wherein the semi-arcuate outer surface comprises a plurality of machined holes;
   at least one wear plug configured to be inserted and retained within each of the plurality of machined holes, wherein the at least one wear plug comprises a length substantially the same as the depth of the plurality of machined holes;
   wherein the at least one wear plug is inserted and retained within each of the plurality of machined holes such that the at least one wear plug is flush with the semi-arcuate outer surface of the medial portion of the assembly.

2. The track slide assembly of claim 1 wherein the plurality of holes comprises from 24 machined holes to 48 machined holes.

3. The track slide assembly of claim 1 wherein the plurality of machined holes comprises 32 machined holes.

4. The track slide assembly of claim 1 wherein the plurality of machined holes are uniformly distributed about the semi-arcuate outer surface and between the first proximal end and the second distal end of the medial portion of the assembly.

5. The track slide assembly of claim 1 wherein the plurality of machined holes are non-uniformly distributed about the semi-arcuate outer surface and between the first proximal end and the second distal end of the medial portion of the assembly.

6. The track slide assembly of claim 1 wherein the plurality of machined holes comprise multiple, distinct orientations relative to the semi-arcuate outer surface of the medial portion of the assembly.

7. The track slide assembly of claim 6 wherein the orientation of the plurality of machined holes are normal to the semi-arcuate outer surface of the medial portion of the assembly.

8. The track slide assembly of claim 1 wherein the at least one wear plug is retained in each of the plurality of machined holes by an interference connection.

9. The track slide assembly of claim 1 wherein the at least one wear plug is retained in each of the plurality of machined holes through use of an adhesive or bonding agent.

10. The track slide assembly of claim 1 wherein the at least one wear plug is selectively removeable from each of the plurality of machined holes.

11. The track slide assembly of claim 1 wherein the at least one wear plug is selectively replaceable in each of the plurality of machined holes.

12. The track slide assembly of claim 10 wherein the at least one wear plug is inspected or measured after selectively removal from each of the plurality of machined holes.

13. The track slide assembly of claim 1 wherein the at least one wear plug is retained in each of the plurality of machined holes by a friction connection.

14. The track slide assembly of claim 1 wherein the at least one wear plug is one (1) inch in diameter and approximately three-quarters (¾) inch in depth.

15. The track slide assembly of claim 1 wherein the at least one wear plug is a friction reduction material.

16. The track slide assembly of claim 1 wherein the at least one wear plug is comprised of a graphite material, a polyurethane, a polyethylene, a PTFE, a UHMW or a synthetic material.

17. The track slide assembly of claim 1 wherein the track slide assembly is attached to a crawler assembly associated with a piece of heavy machinery.

18. The track slide assembly of claim 17, wherein multiple track slide assemblies are attached to the crawler assembly.

* * * * *